United States Patent Office 3,257,298
Patented June 21, 1966

3,257,298
METHOD FOR THE PREPARATION OF ACETALS
Lawrence J. Hughes, Hitchcock, Tex., assignor to Monsanto Company, a corporation of Delaware
No Drawing. Filed Sept. 23, 1963, Ser. No. 310,885
8 Claims. (Cl. 204—78)

The present invention relates to a new method for the preparation of acetals and, in particular, is concerned with the preparation of 2-phenylpropionaldehyde dimethyl acetal.

Conventional processes for preparing acetals from aromatic hydrocarbons are multi-step ones. To prepare 2-phenylpropionaldehyde dimethyl acetal, for example, isopropylbenzene or cumene is oxidized using oxygen or air to 2-phenylpropionaldehyde which is in turn reacted with an alcohol in the presence of an acid to yield the acetal. Or, alpha-methylstyrene is oxidized employing an organic peracid such as peracetic acid, perphthalic acid, and the like, to yield the epoxy compound, alpha-methylstyrene oxide (2-phenylpropylene oxide), which is isomerized with, e.g., aluminum chloride, to the aldehyde and the latter is then converted to the acetal by reaction with an alcohol under acidic conditons. Still another method involves reacting alpha-methylstyrene with hypochlorous acid to obtain the chlorohydrin, treating the latter with lime, for example, to convert it to the epoxy derivative, isomerizing to the aldehyde, etc. Other methods have also been proposed but these, too, involve several process steps when a hydrocarbon is used as the starting material. In addition, certain difficulties are inherent in the conventional methods wherein aldehydes are formed because certain aldehydes are subject to decomposition or undergo polymerization or condensation under the reaction conditions employed.

Thus, it is an object of the present invention to produce acetals from a hydrocarbon source material in a single step without the aforementioned difficulties and particularly to produce 2-phenylpropionaldehyde dimethyl acetal from alpha-methylstyrene. This and other objects which will become apparent from the following description and example are attained by subjecting an aromatic hydrocarbon containing an allylic hydrogen atom such as alpha-methylstyrene to electrolytic oxidation. The electrolysis is carried out in an aqueous alcohol containing an alkali metal salt as an electrolyte and using a platinum anode.

The invention is illustrated in the following example which, however, is not to be construed as limiting it in any manner whatsoever.

*Example*

The electrolysis cell used was a simple one consisting of a stoppered glass vessel in which anode and cathode chambers were created by disposing an alundum membrane (25 mm. x 60 mm.) therein. A cylinder of platinum gauze approximately 28 mm. in diameter and 50 mm. long was suspended in the anode chamber while a solid carbon electrode was suspended in the cathode chamber. An agitator was provided in the anode chamber to provide for adequate stirring of the anolyte.

Several runs were made in which about 180 cc. of a solution of alpha-methylstyrene and lithium chloride in a methanol-water solvent was charged to the anode chamber of the cell. This was prepared by mixing 10 g. of alpha-methylsyrene with 20 cc. of a 0.2 N aqueous solution of lithium chloride and then making up the mixture to a volume of 500 cc. with a solution of 0.2 N lithium chloride in methanol. The cathode chamber was filled with a 0.2 N solution of lithium chloride in methanol. A direct current of about 0.8 ampere at a potential of about 7–8 volts was passed through the cell for a period of about 6 hours. Temperature elevated by the heat of reaction was maintained at about 65° C. by refluxing of the anolyte.

The electrolyzed anolytes were combined and charged to a rotary film drier and the methanol was evaporated therefrom. The resulting two-phase mixture was extracted with two 70-ml. portions of ether and the combined extracts were dried over anhydrous sodium sulfate.

The ether was evaporated from the dried ethereal solution and the residue was distilled under vacuum to obtain two fractions, the first amounting to about 9.0 g. and boiling at 64–66° (1 mm.) and the second amounting to 2.0 g. and boiling at 66–67° (0.4 mm.), and a residue of about 8 g. Analysis by gas chromatographic means showed the first fraction to consist of 85% of the major product while the second fraction was a 50:50 mixture of the major product and a second product. Further analysis of the first fraction by means of its infrared spectrum established that the major product contained methoxyl and CH groups with the methoxyl group being characterized by splitting of the type found in acetals. Positive identification was effected by hydrolyzing a portion of the first fraction by boiling it with 3% HCl for two hours to give an oil having an infrared spectrum characteristic of an aldehyde carbonyl. The 2,4-dinitrophenylhydrazone derivative of this product was prepared and found to be identical with the corresponding derivative of 2-phenylpropionaldehyde (hydratropic aldehyde) thus confirming the product of the electrolytic oxidation of alpha-methylstyrene as 2-phenylpropionaldehyde dimethyl acetal.

Some variations in conditions from those given in the example can be made in conducting the electrolytic oxidation process without departing from the scope of the invention. The alcoholic solvent employed, for example, need not be methanol although methanol is preferred because of its stability and superior solvation characteristics. Any of the lower monohydric and dihydric alcohols containing up to about 3 carbon atoms such as ethanol, ethylene glycol, and the propanols can be used. Also, it is not essential that water be employed with the alcoholic solvent. The use of water here facilitates solution of the electrolyte. It also reduces the resistance of the solution, thus effecting a saving in the power required to accomplish the reaction and in the power dissipated as heat which could conceivably cause undesirable chemical side reactions. When water is employed, care should be taken to avoid such an excess as would throw the hydrocarbon out of solution. Generally, the upper limit which should be employed is 10% by weight of the total solvent and preferably from about 4% to about 5% is used.

The alcoholic or aqueous alcoholic solvent is used in considerable excess. Solutions to be electrolyzed are those from about 0.1 to about 0.5 molar with respect to the aromatic hydrocarbon and preferably solutions from about 0.2 to about 0.3 molar in alpha-methylstyrene are employed in the preferred embodiment of the process.

The particular salt employed as the electrolyte or carrier is not critical. While lithium chloride is the preferred one, other electrically conductive inorganic salts, i.e., ionically bonded inorganic salts which are stable in the electrolysis medium such as other alkali metal chlorides, sulfates and acetates can be used. Specific examples thereof include potassium chloride, lithium sulfate, potassium acetate, potassium sulfate, and the like.

There are a number of materials which can be used as membranes to separate the anolyte from the catholyte. While Alundum is one of the most desirable, other forms of porous porcelain, fine mesh sintered glass discs and glass cloth can also be used.

A large variety of materials are suitable for use as cathodes. Suitable substitutes for the carbon used in the example include platinum, stainless steel, copper, silver, nickel, and the like.

In addition to platinum, lead oxide, iron, and nickel can be used as anodes for the electrolytic oxidation. In the present process, the pH of the anolyte is maintained at <7 and preferably from about 1 to about 3, while the pH of the catholyte is maintained on the alkaline side, i.e., >7. Hence, a platinum anode is the most desirable. While gauze anodes are preferred because they increase the anode area within a given space, solid anodes can be used as can pleated solid anodes.

The current density employed in the electrolysis cell may vary from about 4 to about 10 amperes per square decimeter of anode surface but preferably is maintained between about 6 to about 8 amperes per square decimeter of anode surface.

The temperature at which the electrolytic oxidation of the present invention can be conducted may range from about 25° to about 80° C. but is preferably maintained from about 60° to about 70° C.

What is claimed is:

1. A process for the preparation of acetals which comprises electrolytically oxidizing at the anode an aromatic hydrocarbon containing an allylic hydrogen atom in solution in an aqueous alcohol having from 1 to 3 carbon atoms in the presence of an alkali metal salt as an electrolyte and recovering said acetal from the anolyte.

2. The process of claim 1 wherein said alcohol is methanol.

3. The process of claim 2 wherein said alkali metal salt is lithium chloride.

4. A process for the preparation of 2-phenylpropionaldehyde dimethyl acetal which comprises electrolytically oxidizing at the anode alpha-methylstyrene in solution in an aqueous alcohol having from 1 to 3 carbon atoms in the presence of an alkali metal salt as an electrolyte and recovering said 2-phenylpropionaldehyde dimethyl acetal from the anolyte.

5. The process of claim 4 wherein said alcohol is methanol.

6. The process of claim 5 wherein said alkali metal salt is lithium chloride.

7. A process for the preparation of 2-phenylpropionaldehyde dimethyl acetal which comprises electrolytically oxidizing, at a platinum anode, alpha-methylstyrene in solution in aqueous methanol containing not more than 10% by weight of water, said solution being from about 0.1 to about 0.5 molar with respect to alpha-methylstyrene, in the presence of lithium chloride as an electrolyte at a temperature in the range from about 25° to about 80° C. and recovering said 2-phenylpropionaldehyde dimethyl acetal from the anolyte.

8. A process for the preparation of 2-phenylpropionaldehyde dimethyl acetal which comprises electrolytically oxidizing, at a platinum anode, alpha-methylstyrene in solution in aqueous methanol containing from about 4% to about 5% by weight of water, said solution being from about 0.2 to about 0.3 molar with respect to alpha-methylstyrene, in the presence of lithium chloride as an electrolyte at a temperature from about 60° to about 70° C. and recovering said 2-phenylpropionaldehyde dimethyl acetal from the anolyte.

No references cited.

HOWARD S. WILLIAMS, *Primary Examiner.*

H. M. FLOURNOY, *Assistant Examiner.*